(12) United States Patent
Klissner (10) Patent No.: US 7,660,346 B1
(45) Date of Patent: Feb. 9, 2010

(54) APPARATUS AND METHOD FOR ENABLING A CONNECTION OVER A SERIAL INTERFACE

(75) Inventor: Paul K. Klissner, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 720 days.

(21) Appl. No.: 11/142,850

(22) Filed: May 31, 2005

(51) Int. Cl.
*H04B 13/02* (2006.01)
(52) U.S. Cl. .................. 375/222; 375/219; 710/305; 710/313
(58) Field of Classification Search .................. 710/33, 710/62, 105, 305, 313; 327/81, 337, 365, 327/396; 370/293, 389, 465, 364; 375/219, 375/222, 377
See application file for complete search history.

(56) References Cited

U.S. PATENT DOCUMENTS

| | | | | |
|---|---|---|---|---|
| 4,318,085 A | * | 3/1982 | Whiteside et al. | 341/153 |
| 4,434,486 A | * | 2/1984 | Barner et al. | 370/522 |
| 5,761,463 A | * | 6/1998 | Allen | 710/305 |
| 5,892,926 A | * | 4/1999 | Witkowski et al. | 710/100 |
| 7,340,511 B2 | * | 3/2008 | Dove | 709/220 |
| 2002/0194406 A1 | * | 12/2002 | Houlberg | 710/100 |
| 2003/0061522 A1 | * | 3/2003 | Ke et al. | 713/300 |
| 2005/0154799 A1 | * | 7/2005 | Feng et al. | 710/1 |

* cited by examiner

*Primary Examiner*—David C Payne
*Assistant Examiner*—Rahel Guarino
(74) *Attorney, Agent, or Firm*—Marsh Fischmann & Breyfogle LLP; Kent A. Lembke; Michael K. Hsu (57) ABSTRACT

An apparatus for enabling a connection over a serial interface is provided. The apparatus is a connector interface that includes a plurality of switches configured to cross-link signals to switch a straight-through connection to a null-modem connection. Additionally included is a microprocessor in communication with the plurality of switches, whereby the microprocessor is capable of interfacing with the plurality of switches to trigger the switch to the null-modem connection. Circuitry and a hardware implemented method for enabling a connection over a serial interface also are described.

17 Claims, 5 Drawing Sheets

APPARATUS AND METHOD FOR ENABLING A CONNECTION OVER A SERIAL INTERFACE

BACKGROUND

Null-modem is a serial communication method to connect two data terminal equipments (e.g., computers, terminals, printers, etc.) together directly using a special null-modem serial cable. The original RS-232 standard, which is a standard for serial binary data interconnection, only defines connections between data terminal equipments and data communication equipments (e.g., modems), but not between two data terminal equipments. As such, a typical, straight-through RS-232 cable cannot be used to connect two data terminal equipments. To facilitate communication between two data terminal equipments with serial interfaces, a transmit line and a receive line are cross-linked to establish a null-modem connection.

A null-modem cable is an RS-232 serial cable with the transmit line and receive line cross-linked. A regular, straight-through RS-232 serial cable also can be used together with a null-modem adapter. The null-modem adapter contains the necessary cross-links between the signals. When switching between a regular RS-232 connection and a null-modem connection, the null-modem cable must be manually swapped with a regular RS-232 cable. Similarly, if a null-modem adapter is used, the null-modem adapter must be manually removed when switching to a regular RS-232 connection.

When determining whether two data terminal equipments require a regular RS-232 connection or a null-modem connection, a user must manually swap between a regular RS-232 cable and a null-modem cable to test which cable works with the data terminal equipments. Such manual swaps are labor intensive and inconvenient. Furthermore, the two cables or null-modem adaptor required to switch between connections clutter the interconnections between the data terminal equipments with extra hardware.

In view of the foregoing, there is a need to provide a more convenient apparatus and method for enabling a null-modem connection with less clutter and hardware.

SUMMARY

Broadly speaking, the present invention fills these needs by providing apparatuses, circuitries, and hardware implemented methods for enabling a connection over a serial interface. It should be appreciated that the present invention can be implemented in numerous ways, including as a method, a system, or a device. Several inventive embodiments of the present invention are described below.

In accordance with a first aspect of the present invention, an apparatus for enabling a connection over a serial interface is provided. The apparatus is a connector interface that includes a plurality of switches configured to cross-link signals to switch a straight-through connection to a null-modem connection. Additionally included is a microprocessor in communication with the plurality of switches, whereby the microprocessor is capable of interfacing with the plurality of switches to trigger the switch to the null-modem connection.

In accordance with a second aspect of the present invention, a circuit for implementing a null-modem connection over a serial interface is provided. The circuit includes a first switch having a first common port that is in communication with a first transmit data line. The first switch is configured to connect the first transmit data line to a first receive data line. The circuit also includes a second switch having a second common port that is in communication with a second receive data line, whereby the second switch is configured to connect the second receive data line to a second transmit data line.

In accordance with a third aspect of the present invention, a hardware implemented method for implementing a null-modem connection over a serial interface is provided. In this method, a trigger signal is received to switch a straight-through connection to the null-modem connection. As a result of receiving the trigger signal, a first transmit data line that is in communication with a second transmit data line is switched to connect to a first receive data line. A second receive data line that is in communication with the first receive data line is also switched to connect to the second transmit data line.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for apparatuses, circuitries, and hardware implemented methods for enabling a connection over a serial interface. It will be obvious, however, to one skilled in the art, that the present invention may be practiced without some or all of these specific details. In other instances, well known process operations have not been described in detail in order not to unnecessarily obscure the present invention.

The embodiments described herein provide apparatuses, circuitries, and hardware implemented methods for implementing a null-modem connection over a serial interface. In one embodiment, an apparatus connected to two data terminal equipments can be used to switch between a straight-through serial connection and a null-modem connection. As will be explained in more detail below, the apparatus includes switches that are configured to electronically cross-link signals to switch between the straight through connection and the null-modem connection.

Figure 1:
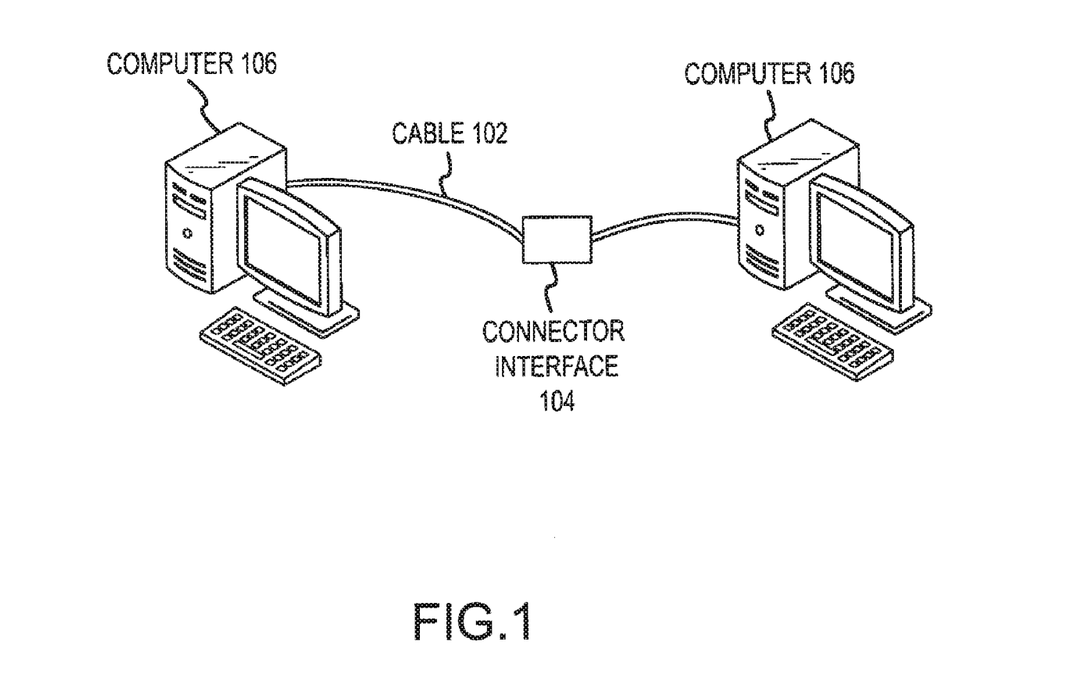
FIG. 1 is a simplified block diagram of an exemplary null-modem connection between two data terminal equipments, in accordance with one embodiment of the present invention.

FIG. 1 is a simplified block diagram of an exemplary null-modem connection between two data terminal equipments, in accordance with one embodiment of the present invention. Null-modem is a communication method to connect two data terminal equipments (e.g., computer, telephone, terminal, printer, etc.) directly over a serial interface without modems, interface card, or other data communication equipments between the two data terminal equipments. As shown in FIG. 1, null-modems may be used for file transfer between two computers 106. In this example, each computer 106 includes a serial port (i.e., an RS-232 port). A cable 102 with connector interface 104 is used to connect computers 106 together via the serial ports to establish a null-modem connection. Connector interface 104 is an apparatus (e.g., a dongle) that interfaces with a data terminal equipment and, as will be explained in more detail below, the connector interface includes switches that are configured to cross-link signals to switch between a straight-through connection and a null-modem connection. Computers 106 may then use a protocol (e.g., Kermit protocol, Microsoft Direct Cable Connection protocol, Hcom protocol, etc.) that allows communication and/or mapping of a hard disk as a network drive on the other computer to transfer files between the computers.

Figure 2:
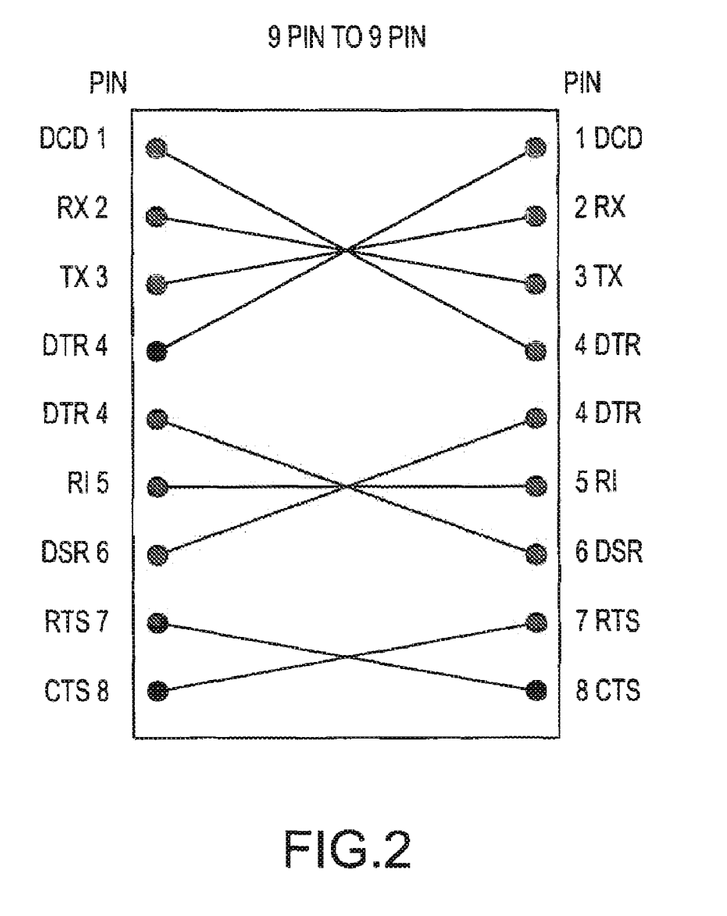
FIG. 2 is an exemplary pin connection diagram of a null-modem cable, in accordance with one embodiment of the present invention.

FIG. 2 is an exemplary pin connection diagram of a null-modem cable, in accordance with one embodiment of the present invention. It should be appreciated that the RS-232 standard recommends a D-subminiature twenty five-pin connector (DB-25). However, there is a wide variety of RS-232 implementations that use different connectors. For example, since most pins of a DB-25 are unused, space can be saved by using smaller connectors, most notably the nine pin D-subminiature (DB-9) connector used by many personal computers as well as other equipments. Different equipments can have different types of connectors, and a null-modem cable can have any suitable connector to interface with the equipments. For instance, a null-modem cable may have a DB-9 connector on one end and a DB-25 connector on the other end. In another example, a null-modem cable can have a Firewire connector (i.e., Institute of Electrical and Electronics Engineers (IEEE) 1394) on one end and a DB-25 connector on the other end.

FIG. 2 shows an exemplary null-modem cable with nine pins on both ends that connect to DB-9 connectors. With a null-modem connection, the transmit data (Tx) line and receive data (Rx) line are cross-linked. Depending on the purpose, one or more handshake lines are also cross-linked. For example, many data terminal equipments use other RS-232 pins for out-of-band (i.e., hardware) flow control. One scheme is for a data terminal equipment to assert a request to send (RTS) signal if the data terminal equipment is ready to receive data, and for a data communication equipment to assert a clear to send (CTS) signal when the data communication equipment is able to accept data. In one embodiment, the handshake can be simulated by connecting the RTS pin of one data terminal equipment to the CTS pin of the other data terminal equipment, and vice versa.

Furthermore, a data terminal equipment can assert a data terminal ready (DTR) signal when the data terminal equipment is powered on. Similarly, a data communication equipment can assert a data set ready (DSR) signal when the data communication equipment is powered on and can assert a data carrier detect (DCD) signal when the data communication equipment is connected. In one embodiment, as shown in FIG. 2, by connecting the DTR signal of one data terminal equipment to both the DCD and DSR inputs of the other data terminal equipment (and vice versa), each of the data terminal equipments is tricked into thinking that it is connected to a data communication equipment that is powered up and online. The one signal that is not cross-linked is the ring indicate (RI) signal, which is connected straight-through. It should be appreciated that the pin connection diagram shown in FIG. 2 is merely exemplary. There are a wide variety of null-modem wiring layouts because null-modem is not covered by any standard. For example, another null-modem wiring layout eliminates the cross-linking of the DCD and DTR signals. Accordingly, embodiments of the invention can be applied to any suitable null-modem wiring layouts.

Figure 3:
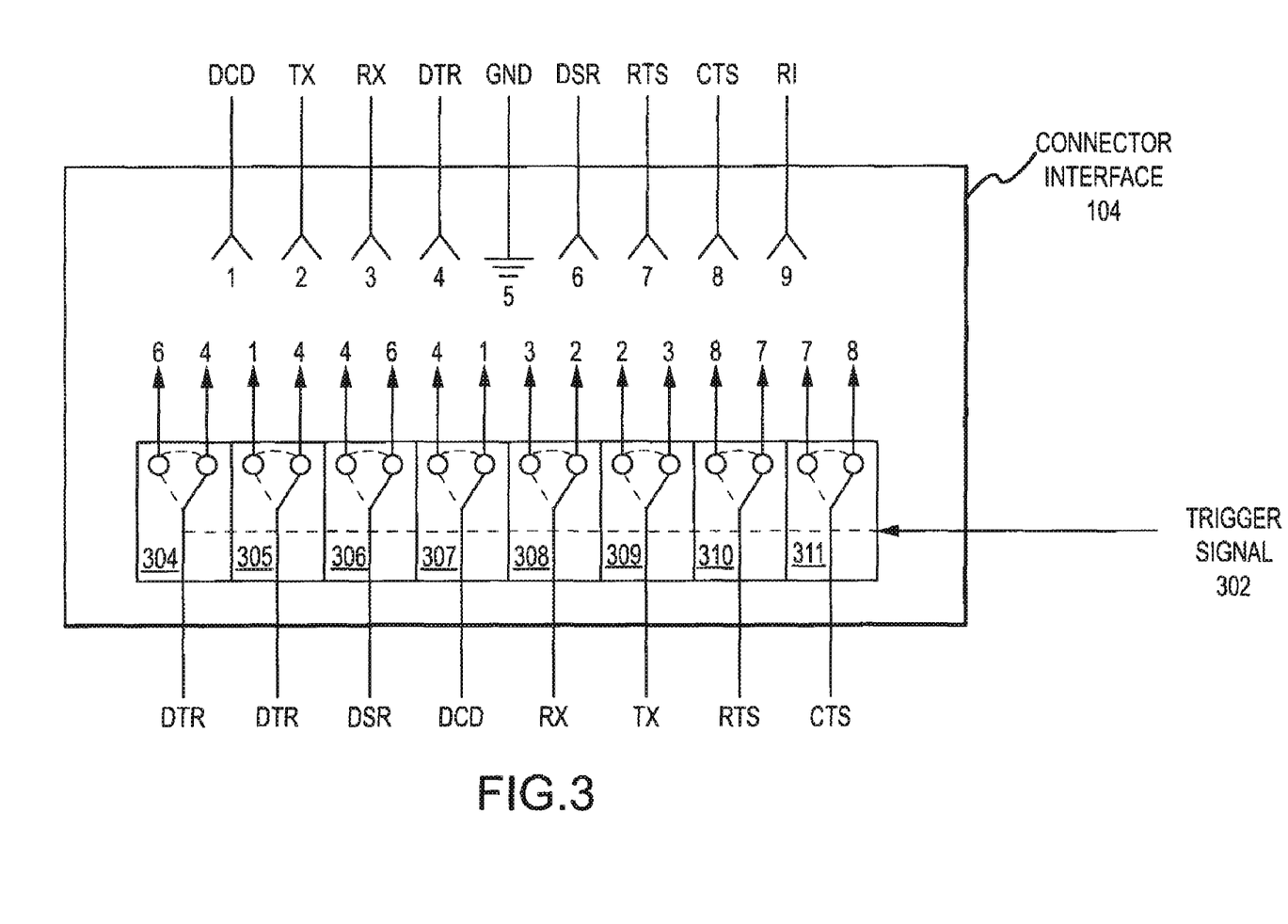
FIG. 3 is a schematic diagram of the circuitry included in the connector interface shown in FIG. 1, in accordance with one embodiment of the present invention.

FIG. 3 is a schematic diagram of the circuitry included in the connector interface shown in FIG. 1, in accordance with one embodiment of the present invention. As shown in FIG. 3, connector interface 104 includes switches 304-311 that are configured to cross-link signals to switch a straight-through connection to a null-modem connection, and vice versa. In other words, connections within connector interface 104 may be switched electronically between a straight-through connection and a null-modem connection. At one end, connector interface 104 includes a DCD line, a Tx line, an Rx line, a DTR line, a ground (GND) line, a DSR line, an RTS line, a CTS line, and an RI line with pin assignments 1-9, respectively. On the other end, connector interface 104 includes switches 304-311 that have common ports in communication with a DTR line, a DSR line, a DCD line, an Rx line, a Tx line, an RTS line, and a CTS line. It should be noted that there are two switches, namely switches 304 and 305, that have common ports in communication with two DTR lines. As discussed above, in one embodiment, the DTR line is wired to both the DSR line and the DCD line. Accordingly, the one DTR line is split into two DTR lines. Switches 304-311 can include any suitable electronic device that can select between multiple lines. Switches 304-311 can be analog or digital. Examples of switches 304-311 include single pole, double throw switches and double pole, double throw analog switches, etc.

In one embodiment, switches 304-311 are configured to establish a straight-through connection. Specifically, switches 304, 305 connect the DTR line to the DTR line at pin 4. Switch 306 connects the DSR line to the DSR line at pin 6. Switch 307 connects the DCD line to the DCD line at pin 1. Switch 308 connects the Rx line to the Rx line at pin 3. Switch 309 connects the Tx line to the Tx line at pin 2. Switch 310 connects the RTS line to the RTS line at pin 7. Switch 311 connects the CTS line to the CTS line at pin 8.

In another embodiment, switches 304-311 can be configured to switch from a straight-through connection to a null-modem connection. In particular, switch 308, with a common port in communication with the Rx line, switches to connect the Rx line to the Tx line at pin 2. Switch 309, with a common port in communication with the Tx line, switches to connect the Tx line to the Rx line at pin 3. Depending on the purpose, one or more handshake lines can also be cross-linked. In one embodiment, switch 311, with a common port in communication with the CTS line, switches to connect the CTS line to the RTS line at pin 7. Conversely, switch 310, with a common port in communication with the RTS line, switches to connect the RTS line to the CTS line at pin 8. Other handshake lines that can be cross-linked include the DCD line, the DTR line, and the DSR line. In this embodiment, switch 307, with a common port in communication with the DCD line, switches to connect the DCD line to the DTR line at pin 4. Vice versa, switch 305, with a common port in communication with the DTR line, switches to connect the DTR line to the DCD line at pin 1. Similarly, in another embodiment, switch 306, with a common port in communication with the DSR line, switches to connect the DSR line to the DTR line at pin 4. Conversely, switch 304, with a common port in communication with the DTR line, switches to connect the DTR line to the DSR line at pin 6.

Still referring to FIG. 3, trigger signal 302 is inputted into one or more switches 304-311 to trigger a switch between the straight-through connection and the null-modem connection.

In one embodiment, switches 304-311 are independently controllable. As such, a trigger signal may be inputted into each of the switches 304-311 (not shown) to trigger the switch. In another embodiment, as shown in FIG. 3, switches 304-311 are connected together such that all the switches are in communication with each other. Accordingly, a single trigger signal 302 inputted into one of the switches 304-311 triggers all the switches to select either the straight-through connection or the null-modem connection. Here, trigger signal 302 is a single-bit signal (i.e., high or low signal) because switches 304-311 switch between two states. Any suitable sources may generate trigger signal 302. In one exemplary embodiment, a microprocessor can generate trigger signal 302. In another exemplary embodiment, a battery may be used to generate trigger signal 302.

Figure 4:
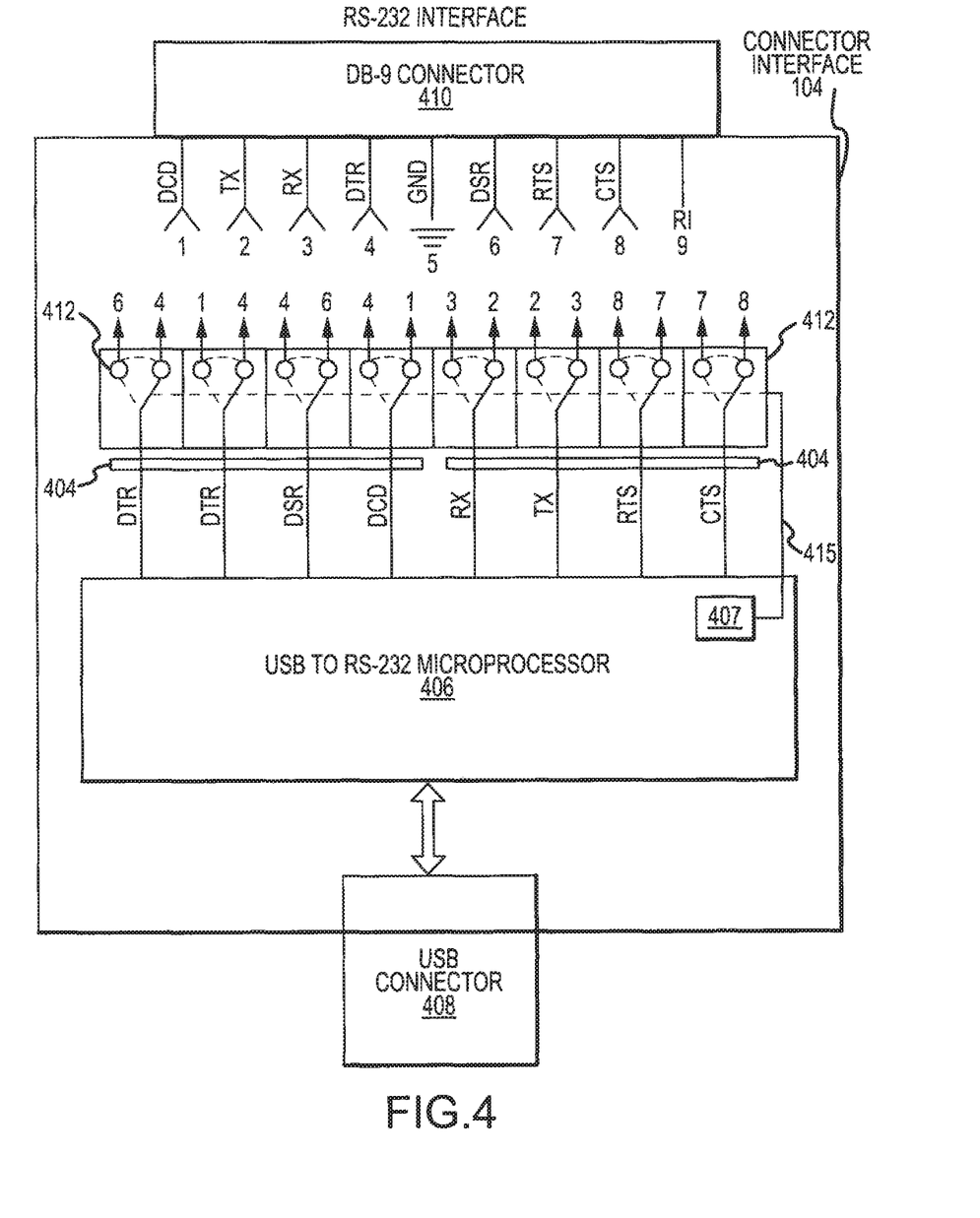
FIG. 4 is a schematic diagram of an alternative embodiment of the circuitry shown in FIG. 3.

FIG. 4 is a schematic diagram of an alternative embodiment of the circuitry shown in FIG. 3. As shown in FIG. 4, connector interface 104 interfaces an RS-232 interface with a Universal Serial Bus (USB) interface. One skilled in the art will appreciate that a USB interface is a plug-and-play interface between a computer and add-on devices. Connector interface 104 can be used in an RS-232 to USB converter cable. Connector interface 104 includes DB-9 connector 410 in communication with a DCD line, a Tx line, an Rx line, a DTR line, a GND line, a DSR line, an RTS line, a CTS line, and an RI line. FIG. 4 additionally shows the pin assignments (1-9) for each of the lines. Connector interface 104 also includes USB to RS-232 microprocessor 406 that is in communication with USB connector 408 and switches 412. Each of the switches 412 have a common port that is in communication with a DTR line, a DSR line, a DCD line, an Rx line, a Tx line, an RTS line, or a CTS line that is connected to USB to RS-232 microprocessor 406. Switches 412 are also in communication with USB to RS-232 microprocessor 406 through trigger line 415, which is connected to a spare input/output line of the USB to RS-232 microprocessor. In communication with switches 412 and USB to RS-232 microprocessor 406 are voltage conversion circuitries 404 (e.g., voltage regulators, line drivers, etc.), which is located between the switches and the USB to RS-232 microprocessor.

USB to RS-232 microprocessor 406 includes the logic to convert between RS-232 signals and USB signals. Additionally included is switching logic 407 that triggers switches 412 to switch between a straight-through connection and a null-modem connection. It should be appreciated that individual switches may be packaged together into a single, grouped switch. As shown in FIG. 4, switches 412 are packaged together into two groups of four individual switches. Switches 412 are connected together such that all the switches are in communication with each other. Accordingly, switching logic 407 can send a single-bit trigger signal through trigger line 415 to trigger switches 412 to select either the straight-through connection or the null-modem connection. In addition to sending the trigger signal, switching logic 407 can also include logic that uses algorithms to determine whether the connection is straight-through or null-modem based on test signals sent through the lines. Once a determination is made, switching logic 407 can trigger the switch to accommodate the connection.

USB to RS-232 microprocessor 406 and most other microprocessors operate at logic voltage levels from 0 to 5V DC, whereas the RS-232 standard specifies a maximum open-circuit voltage of 25V. Depending on the power supplies available within a device, common RS-232 signal levels include ±5V, ±10V, ±12V, and ±15V. If the line level voltage on the RS-232 interface is higher than the voltage of USB to RS-232 microprocessor 406, the voltage can be converted such that switches 412 switch at the higher RS-232 voltage. In other words, there is usually not enough voltage from USB to RS-232 microprocessor 406 to operate switches 412 at the RS-232 interface. Accordingly, the voltage from USB to RS-232 microprocessor 406 is converted to a higher voltage. In addition to stepping-up a voltage, voltage conversion circuitries 404 can also step-down voltages. It should be appreciated that voltage conversion circuitries 404 are directional such that the voltage conversion circuitries can step voltages up from voltage of USB to RS-232 microprocessor 406 to the voltage of the RS-232 interface or step voltages from the RS-232 interface down to the voltages of the USB to RS-232 microprocessor. For example, USB to RS-232 microprocessor 406 asserts the DTE signal at 3.3V. As a result, voltage conversion circuitries 404 steps the 3.3V up to RS-232 interface's 15V. Conversely, in another example, the RS-232 interface asserts DSR signal at 15V. Accordingly, voltage conversion circuitries 404 steps the 15V down to 3.3V before sending the DSR signal to USB to RS-232 microprocessor 406. It should be noted that a Tx signal, a DTR signal, and an RTS signal are output (voltage generating) signals. On the other hand, a DSR signal, a CTS signal, a DCD signal, and an Rx signal are input (voltage receiving) signals.

Figure 5:
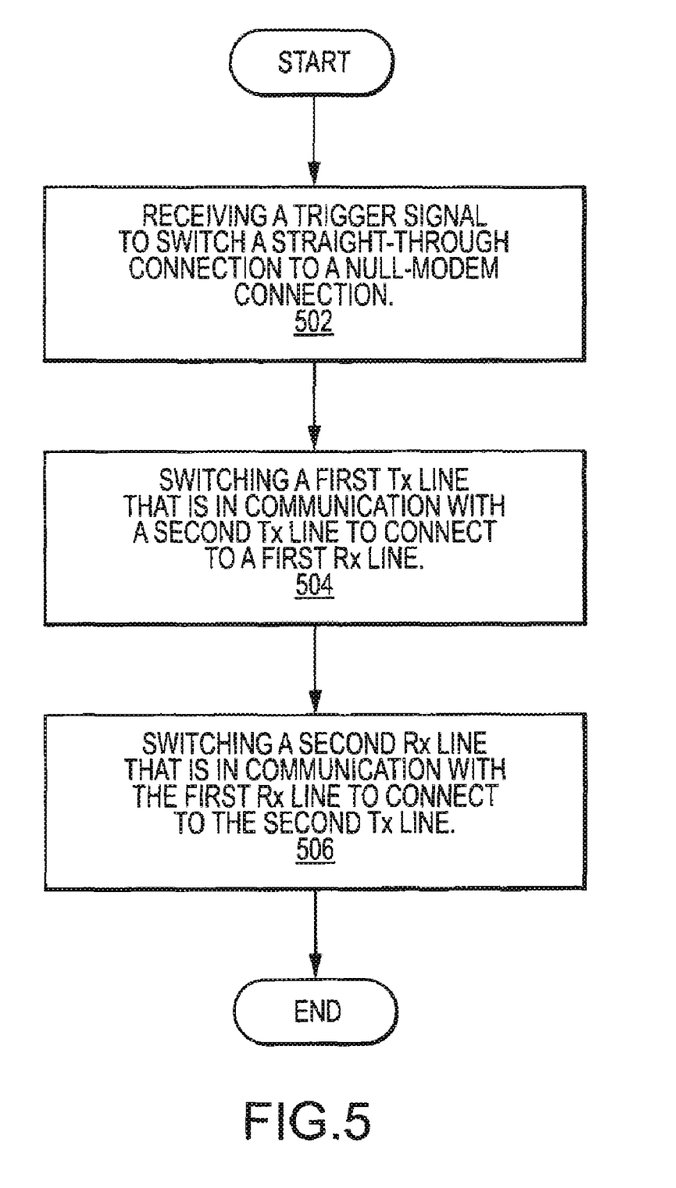
FIG. 5 is a flowchart diagram of a high level overview of a hardware implemented method for implementing a null-modem connection over a serial interface, in accordance with one embodiment of the present invention.

FIG. 5 is a flowchart diagram of a high level overview of a hardware implemented method for implementing a null-modem connection over a serial interface, in accordance with one embodiment of the present invention. As shown in FIG. 5, starting in operation 502, a trigger signal to switch a straight-through connection to a null-modem connection is received. Thereafter, the null-modem connection is implemented by cross-linking the Tx line and the Rx line. Specifically, in operation 504, a first Tx line that is in communication with a second Tx line is switched to connect to a first Rx line. At the same time, in operation 506, a second Rx line that is in communication with the first Rx line is switched to connect to the second Tx line.

Additionally, as discussed above, one or more handshake lines can also be cross-linked. In one embodiment, a first CTS line that is in communication with a second CTS line is switched to connect to a first RTS line. At the same time, a second RTS line that is in communication with the first RTS line is switched to connect to the second CTS line. In another embodiment, a first DCD line that is in communication with a second DCD line is switched to connect to a first DTR line. At the same time, a second DTR line that is in communication with the first DTR line is switched to connect to the second DCD line. In still another embodiment, a first DSR line that is in communication with a second DSR line is switched to connect to the first DTR line. At the same time, a second DTR line that is in communication with the first DTR line is switched to connect to the second DSR line.

In summary, the above-described embodiments provide hardware implemented methods, circuitries, and apparatuses for implementing a null-modem connection over a serial interface. Electronically switching internal connections is much more convenient than physically swapping cables. Furthermore, by combining the capability to switch between a straight-through connection and a null-modem connection into a single connector interface, embodiments of the invention use one cable, with the connector interface attached, instead of the conventional two cables required for switching between connections. Thus, the use of one cable instead of two cables simplifies the implementation of the null-modem connection and eliminates extra hardware and clutter.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. An apparatus for enabling a connection over a serial interface, comprising:
   a connector interface including,
      a first connector and a second connector,
      a plurality of switches configured to cross-link signals to switch a straight-through connection between the first and second connectors to a null-modem connection between the first and second connectors, wherein the straight-through connection comprises a first transmit data line connected to a second transmit data line and comprises a first receive data line connected to second data receive line and further wherein the null-modem connection comprises the first transmit data line connected to the second data receive line and the first receive data line connected to the second transmit data line, and
      a microprocessor in communication with the plurality of switches, the microprocessor being capable of interfacing with the plurality of switches to trigger the switch from the straight-through connection to the null-modem connection.

2. The apparatus of claim 1, wherein the plurality of switches include,
   a first switch in communication with the microprocessor, the first switch having a first common port that is in communication with the first transmit data line and the first switch being configured to connect the first transmit data line to the second receive data line; and
   a second switch in communication with the first switch and the microprocessor, the second switch having a second common port that is in communication with the first receive data line and the second switch being configured to connect the first receive data line to the second transmit data line.

3. The apparatus of claim 1, wherein the microprocessor is a Universal Serial Bus to RS-232 microprocessor.

4. The apparatus of claim 1, wherein each of the plurality of switches is defined by one of a single pole, double throw analog switch and a double pole, double throw analog switch.

5. The apparatus of claim 1, further comprising:
   a voltage conversion circuitry in communication with the plurality of switches, the voltage conversion circuitry being configured to step-up voltage to a line level voltage of the serial interface or step-down the voltage to a voltage of the microprocessor.

6. A circuit for implementing a null-modem connection over a serial interface, comprising:
   a plurality of switches configured to cross-link signals to switch a straight-through connection between a first connector and a second connector to a null-modem connection between said first connector and said second connector, said plurality of switches including:
   a first switch having a first common port that is in communication with a first transmit data line, the first switch being configured to connect the first transmit data line to a first receive data line;
   a second switch having a second common port that is in communication with a second receive data line, the second switch being configured to connect the second receive data line to a second transmit data line;
   a third switch having a third common port that is in communication with a first data set ready line, the third switch being configured to connect the first data set ready line to a first data terminal ready line;
   a fourth switch having a fourth common port that is in communication with a first clear to send line, the fourth switch being configured to connect the first clear to send line to a first request to send line; and
   a fifth switch having a fifth common port that is in communication with a second request to send line, the fifth switch being configured to connect the second request to send line to a second clear to send line.

7. The circuit of claim 6, further comprising:
   a sixth switch having a sixth common port that is in communication with a first data carrier detect line, the sixth switch being configured to connect the first data carrier detect line to a first data terminal ready line; and
   a seventh switch having a seventh common port that is in communication with a second data terminal ready line, the seventh switch being configured to connect the second data terminal ready line to a second data carrier detect line.

8. The circuit of claim 7, further comprising:
   an eighth switch having an eighth common port that is in communication with a second data terminal ready line, the eighth switch being configured to connect the second data terminal ready line to a second data set ready line.

9. The circuit of claim 6, wherein each of the first and second switches is defined as a single pole, double throw switch.

10. The circuit of claim 6, wherein the first and second switches are in communication such that a signal inputted into one of the first switch or the second switch triggers switching of the first and second switches.

11. The circuit of claim 6, further comprising:
a microprocessor in communication with the first and second switches, the microprocessor being configured to send a signal to trigger switching of the first and second switches.

12. The circuit of claim 11, wherein the microprocessor is a Universal Serial Bus to RS-232 microprocessor.

13. The circuit of claim 11, further comprising:
a voltage conversion circuitry in communication with the first and second switches and the microprocessor, the voltage conversion circuitry being configured to step-up voltage to a line level voltage of the serial interface or step-down the voltage to a voltage of the microprocessor.

14. A hardware implemented method for implementing a null-modem connection over a serial interface, comprising method operations of:
receiving a trigger signal to switch a straight-through connection between a first connector and a second connector to the null-modem connection between said first connector and said second connector;
switching a first transmit data line that is in communication with a second transmit data line to connect to a first receive data line;
switching a second receive data line that is in communication with the first receive data line to connect to the second transmit data line;
switching a first clear to send line that is in communication with a second clear to send line to connect to a first request to send line; and
switching a second request to send line that is in communication with the first request to send line to connect to the second clear to send line.

15. The hardware implement method of claim 14, further comprising:
switching a first data carrier detect line that is in communication with a second data carrier detect line to connect to a first data terminal ready line; and
switching a second data terminal ready line that is in communication with the first data terminal ready line to connect to the second data carrier detect line.

16. The hardware implemented method of claim 14, further comprising:
switching a first data set ready line that is in communication with a second data set ready line to connect to a first data terminal ready line; and
switching a second data terminal ready line that is in communication with the first data terminal ready line to connect to the second data set ready line.

17. The apparatus of claim 1, wherein the microprocessor comprises logic that processes test signals to determine whether the connection between two devices communicatively linked via the connector interface is null-modem and, in response to the processing of the test signals, transmitting at least one signal to trigger the switches to switch from the straight-through connection to the null-modem connection.

* * * * *